United States Patent
Bauer et al.

[15] 3,681,498
[45] Aug. 1, 1972

[54] ISOTHIAZOLYL PYRIDINIUM SALTS AS HYPOGLYCEMIC AGENTS

[72] Inventors: Victor John Bauer, Montvale; Sidney Robert Safir, River Edge, both of N.J.

[73] Assignee: American Cyanamid Company, Stamford, Conn.

[22] Filed: Oct. 19, 1970

[21] Appl. No.: 82,061

Related U.S. Application Data

[63] Continuation-in-part of Ser. No. 875,528, Nov. 10, 1969, Pat. No. 3,592,899.

[52] U.S. Cl. ............................................... 424/263
[51] Int. Cl. ............................................... A61k 27/00
[58] Field of Search ..................... 424/263; 260/296

[56] References Cited

UNITED STATES PATENTS 3,574,842   4/1971   Bauer et al. ................... 424/263

*Primary Examiner*—Jerome D. Goldberg
*Attorney*—Ernest Y. Miller

[57] ABSTRACT

This application describes quaternary isothiazolylpyridinium salts, compositions containing quaternary isothiazolylpyridinium salts, and also the method of use of the isothiazolylpyridinium salts. These compositions are useful in warm-blooded animals for their hypoglycemic activity.

7 Claims, No Drawings

ISOTHIAZOLYL PYRIDINIUM SALTS AS HYPOGLYCEMIC AGENTS

This application is a continuation-in-part of our application Ser. No. 875,528, filed Nov. 10, 1969, now U.S. Pat. No. 3,592,899.

PRIOR ART

Applicants are aware of British Pat. No. 875,887, which discloses a number of heterocyclic pyridinium halides. However, no isothiazolylpyridinium salts are disclosed nor is there disclosed a use of any compounds as hypoglycemic agents.

SUMMARY OF THE INVENTION

This invention relates to new compositions of matter. More particularly, it relates to quaternary isothiazolylpyridinium salts and their use as the active components of compositions and method of use thereof.

The active components of the new compositions of the present invention may be illustrated by the following formula:

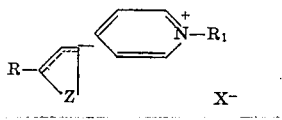

where R and $R_1$ are lower alkyl; Z is a trivalent radical selected from the group consisting of

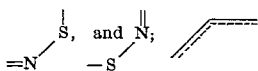

represents one double bond; and X is a monovalent pharmaceutically acceptable anion. The anion may be, for example, chloride, bromide, iodide, and the like. The dotted line represents one double bond, the position of which is dependent upon the definition of Z. When Z is

the double bond is adjacent to R and when Z has the other meaning, the double bond is adjacent to the pyridinium ring. The term lower alkyl is intended to include those having one to four carbon atoms.

In general, the active components are crystalline solids, soluble in water.

The active components of the present invention may be prepared by a general reaction sequence. An isoxazolylpyridine is hydrogenated to provide an aminopyridyl-butenone, which is fused with phosphorus pentasulfide to provide an isothiazolylpyridine. Reaction of the isothiazolylpyridine with an alkyl halide provides a quaternary isothiazolylpyridinium salt, an active component of this invention.

The intermediate isothiazolylpyridines before quaternization may be illustrated by the following formula:

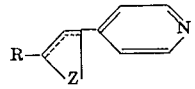

wherein R and Z are as hereinbefore defined.

These reactions are illustrated schematically below:

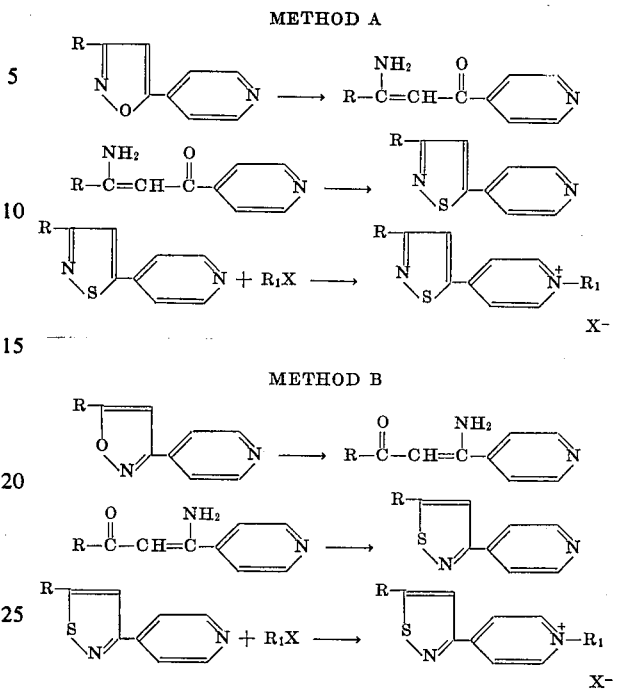

wherein R, $R_1$ and X are as defined above.

Among the active components of the present invention are, for example: 1-methyl-4-(3-methyl-5-isothiazolyl)pyridinium iodide, 1-methyl-4-(5-methyl-3-isothiazolyl)pyridinium chloride, 1-butyl-4-(3-ethyl-5-isothiazolyl)pyridinium chloride, and the like.

The active components of the present invention show hypoglycemic activity in warm-blooded animals which indicates they are useful as medicaments in the lowering of blood sugar levels. When the active components are administered orally to normal mice, a reduction of blood sugar levels is observed. Mice used in these studies are CF–1–S (Carworth Farms, 25–30 g. each). The active components of this invention are administered by gavage as saline solutions. Control animals receive an equivalent volume of vehicle. Food is withheld from animals after dosing. Blood glucose is determined 3 to 5 hours after dosing by the method of Hoffman [J. Biol. Chem., 120, 51 (1937)] as adapted to the Technicon Auto Analyzer and is expressed as percent change from saline controls. Blood samples are obtained from retrobulbar plexuses of mice. The testing data is summarized in the following table.

TABLE

Decrease in Blood Glucose in Normal Mice After Oral Administration of Quaternary Isothiazolylpyridinium Salts

| Compound | Hours after dosing | Dose mg. /kg. | % Decrease in blood glucose[x] |
|---|---|---|---|
| 1-Methyl-4-(3-methyl-5-isothiazolyl)pyridinium iodide | 5 | 159 | 13±3 |
|  |  | 318 | 35±9 |
|  |  | 477 | 40±9 |
| 1-Methyl-4-(5-methyl-3-isothiazolyl)pyridinium iodide | 3 | 95 | 62±12 |
|  |  | 159 | 93±1 |

[x]Values are means ± standard errors of 4 to 6 mice per dose and are expressed as percent decrease from predose values.

These results show that the compositions of the present invention are useful in the lowering of blood glucose in warm-blooded animals. The present compounds may be used at a dose of from 1 mg. to 500 mg. per kilogram of body weight of warm-blooded animal.

The active components of this invention can be used in compositions such as tablets; the principal active ingredient is mixed with conventional tableting ingredients such as corn starch, lactose, sucrose, sorbitol, talc, stearic acid, magnesium stearate, dicalcium phosphate, gums, and fractionally similar materials as pharmaceutical diluents or carriers. The tablets or pills of the novel compositions can be laminated or otherwise compounded to provide a dosage form affording the advantage of prolonged or delayed action or predetermined successive action of the enclosed medication. For example, the table or pill can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate and the like. A particularly advantageous enteric coating comprises a styrene maleic acid copolymer together with known materials contributing to the enteric properties of the coating.

The liquid forms in which the novel compositions of the present invention may be incorporated for administration include suitably flavored emulsions with edible oils, such as, cottonseed oil, sesame oil, coconut oil, peanut oil, and the like, as well as elixirs and similar pharmaceutical vehicles. Sterile suspensions or solutions are required for parenteral use. Isotonic preparations containing suitable preservatives are also highly desirable for injection use.

The term dosage form as described herein refers to physically discrete units suitable as unitary dosage for warm-blooded animal subjects, each unit containing a predetermined quantity of active component calculated to produce the desired therapeutic effect in association with the required pharmaceutical diluent, carrier or vehicle. The specification for the novel dosage forms of this invention are indicated by (a) the unique characteristics of the active component and the particular therapeutic effect to be achieved, and (b) the limitations inherent in the art of compounding such an active component for therapeutic use in warm-blooded animals as disclosed in this specification, these being features of the present invention. Examples of suitable oral dosage forms in accord with this invention are tablets, capsules, pills, powders, granules, wafers, cachets, teaspoonfuls, dropperfuls, ampules, vials, segregated multiples of any of the foregoing and other forms as herein described.

DETAILED DESCRIPTION

The preparation of the active components of this invention along with compositions containing the same will be described in greater detail in the following examples.

EXAMPLE I

Preparation of 3-Amino-1-(4-pyridyl)-2-buten-1-one

A mixture of 20 g. (0.125 mole) of 4-(3-methyl-5-isoxazolyl)pyridine, 2.5 g. of platinum oxide, and 300 ml. of ethanol is hydrogenated at 40 p.s.i. for 3 hours. The mixture is filtered, and the filtrate is concentrated to a solid. Recrystallization from ethyl acetate provides colorless crystals, melting point 211°–213° C.

EXAMPLE II

Preparation of 4-(3-Methyl-5-isothiazolyl)pyridine

A mixture of 3.6 g. (0.022 mole) of 3-amino-1-(4-pyridyl)-2-buten-1one and 6 g. of phosphorus pentasulfide is fused at 150° C. for 1 hour, cooled to room temperature, warmed with 1N potassium hydroxide, and extracted with chloroform. The chloroform extract is dried over anhydrous magnesium sulfate and concentrated to a solid. Sublimation at 90°C. (18 mm.) provides colorless needles, melting point 56°–60° C.

EXAMPLE III

Preparation of 1-Amino-1-(4-pyridyl)-1-buten-3-one

A mixture of 0.48 g. (0.003 mole) of 4-(5-methyl-3-isoxazolyl)pyridine, 0.1 g. of platinum oxide, and 35 ml. of ethanol is hydrogenated at 1 atmosphere for 18 hours and filtered. The filtrate is concentrated to a solid. Recrystallization from ethyl acetate-hexane followed by sublimation at 155° C. (13 mm.) provides pale yellow crystals, melting point 152°–153° C.

EXAMPLE IV

Preparation of 4-(5-Methyl-3-isothiazolyl)pyridine

A mixture of 1.0 g. (0.0062 mole) of 1-amino-1-(4-pyridyl)-1-buten-3-one and 1.8 g. of phosphorus pentasulfide is fused at 190° C. for one-half hour, cooled, diluted with water, made alkaline with 1N potassium hydroxide, and extracted with chloroform. The chloroform solution is dried over anhydrous magnesium sulfate and concentrated to a solid. Sublimation at 115° C. (15 mm.) provides colorless needles, melting point 49°–52° C.

EXAMPLE V

Preparation of 1-Methyl-4-(3-methyl-5-isothiazolyl)pyridinium Iodide

A solution of 0.4 g. (0.0023 mole) of 4-(3-methyl-5-isothiazolyl)pyridine, 2 ml. of methyl iodide, and 15 ml. of ethanol is heated under reflux for 1.5 hours, cooled, and diluted with ether. A solid separates and is recrystallized from acetonitrile-ether to provide yellow crystals, melting point 176°–177° C., dec.

EXAMPLE VI

Preparation of 1-Methyl-4-(5-methyl-3-isothizolyl)pyridinium Iodide

A solution of 0.26 g. (0.0015 mole) of 4-(5-methyl-3-isothiazolyl)pyridine, 2 ml. of methyl iodide, and 100 ml. of ethanol is heated under reflux for 1.5 hours, cooled, and diluted with ether. A solid separates and is recrystallized from ethanol-ether to provide yellow crystals, melting point 110°–112°C., dec.

EXAMPLE VII

Preparation of Tablet Compositions Containing 1-Methyl-4-(3-methyl-5-isothiazolyl)pyridinium iodide

|  | Per 1000 Tablets |
| --- | --- |
| 1-methyl-4-(3-methyl-5-isothiazolyl)pyridinium iodide | 10.0 grams |
| Corn starch USP | 30.0 |
| Dibasic calcium phosphate | 215.0 |
| magnesium stearate | 6.0 |

The above ingredients are thoroughly mixed and incorporated into a standard pharmaceutical tablet. Each tablet contains 10 mg. of active component.

EXAMPLE VIII

Preparation of Hard Shell Capsules Containing 1-Methyl-4-(5-isothiazolyl)pyridinium iodide

|  | Per 1000 Capsules |
| --- | --- |
| 1-methyl-4-(5-isothiazolyl)pyridinium iodide | 20.0 grams |
| Lactose | 90.0 |
| Magnesium stearate | 1.0 |

The active component, lactose and magnesium stearate are blended together. The mixture is used to fill hard shell capsules of a suitable size each containing 20 mg. of active component.

EXAMPLE IX

Preparation of Oral Syrup of 1-Methyl-4-(5-methyl-3-isothiazolyl)-pyridinium iodide

|  | Amt. per 100 ml. |
| --- | --- |
| 1-methyl 4-(5-methyl-3-isothiazolyl)pyridinium iodide | 0.375 g. |
| Sodium saccharin NF | 0.010 g. |
| Sodium citrate USP | 0.250 g. |
| methyl paraben USP | 0.072 g. |
| propyl paraben USP | 0.018 g. |
| cherry flavor | 0.105 g. |
| FD and C Red 2 | 0.100 g. |
| Sorbitol | 50.00 g. W/W |
| Purified water q.s. a.d. | 100.00 ml. |

Dissolve the sorbitol and parabens in 40 ml. of purified water at 80° C. cool to 35° C. and add and dissolve the sodium saccharin, sodium citrate, dye and flavor. Add and dissolve the pyridinium iodide. Adjust to final volume with purified water. Each teaspoonful (4 ml.) contains 15 mg. of the active component.

We claim:

1. A method of lowering blood sugar levels in warm-blooded animals which comprises orally administering to said animal an effective blood sugar lowering amount of a quaternary isothiazolylpyridinium salt of the formula:

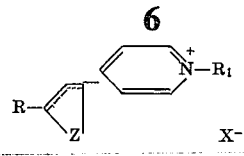

wherein R and $R_1$ are lower alkyl; Z is a trivalent radical selected from the group consisting of

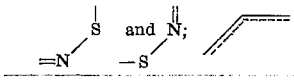

represents one double bond; X is a monovalent pharmaceutically acceptable anion and a pharmaceutical carrier.

2. The method according to claim 1, wherein the quaternary isothiazolylpyridinium salt is 1-methyl-4-(5-methyl-3-isothiazolyl)pyridinium iodide.

3. The method according to claim 1, wherein the quaternary isothiazolylpyridinium salt is 1-methyl-4-(3-ethyl-5-isothiazolyl)pyridinium chloride.

4. The method according to claim 1, wherein the quaternary isothiazolylpyridinium salt is 1-butyl-4-(3-methyl-5-isothiazolyl)pyridinium chloride.

5. The method according to claim 1, wherein the quaternary isothiazolylpyridinium salt is 1-methyl-4-(3-methyl-5-isothiazolyl)pyridinium iodide.

6. An orally administerable composition for lowering blood sugar levels in warm-blooded animals which comprises a pharmaceutically acceptable carrier and from 1 to 500 mg. per kilograms of warm-blooded animal body weight of a quaternary isothiazolylpyridinium salt of the formula:

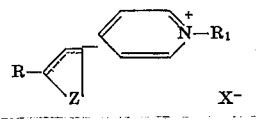

wherein R and $R_1$ are lower alkyl; Z is a trivalent radical selected from the group consisting of

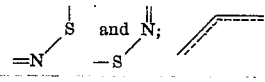

represents one double bond and X is a monovalent pharmaceutically acceptable anion.

7. The composition according to claim 6, wherein the quaternary isothiazolylpyridinium salt is 1-methyl-4-(3-methyl-5-isothiazolyl)pyridinium iodide.

* * * * *